United States Patent

[11] 3,585,790

| [72] | Inventor | Lester Kalkwarf |
| | | R.F.D. #2, Aurora, Nebr. 68818 |
| [21] | Appl. No. | 827,612 |
| [22] | Filed | May 26, 1969 |
| [45] | Patented | June 22, 1971 |

[54] CORN HARVESTER SPLIT ADJUSTABLE SNOUT CONSTRUCTION
8 Claims, 6 Drawing Figs.

[52] U.S. Cl. .................................................. 56/119, 56/106
[51] Int. Cl. .............................................. A01d 45/02
[50] Field of Search ........................................... 56/18, 59, 103, 105, 106, 119

[56] References Cited
UNITED STATES PATENTS

| 1,090,150 | 5/1914 | Hibbs ............................ | 56/18 |
| 1,936,760 | 11/1933 | Hitchcock ...................... | 56/18 |
| 2,989,834 | 6/1961 | Pool et al. ...................... | 56/119 |
| 3,271,940 | 9/1966 | Ashton et al. .................. | 56/105 |

*Primary Examiner*—A. F. Guida
*Attorneys*—Clarence A. O'Brien and Harvey B. Jacobson ABSTRACT: A multiple row corn head for a combine including a transverse frame provided with forwardly projecting divider elements spaced transversely of the head. Each divider element disposed between the outer or opposite end divider element includes a bifurcated forward end defining a pair of horizontally spaced-apart arms supported at their rear base ends for limited adjustable swinging about upstanding axes, whereby the spacing between the forward end of each pair of arms may be varied.

Lester Kalkwarf
INVENTOR.

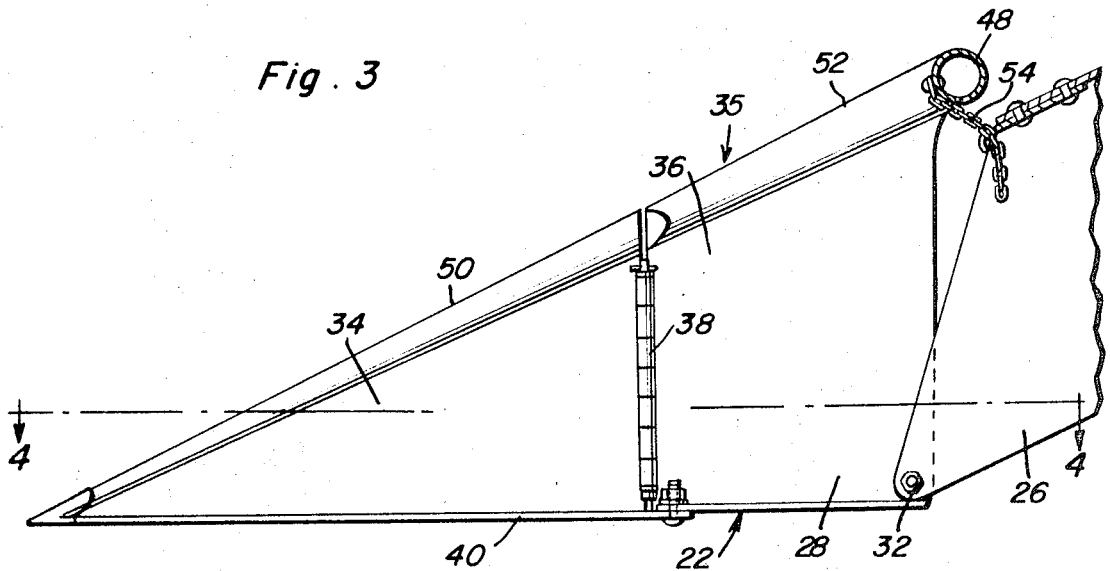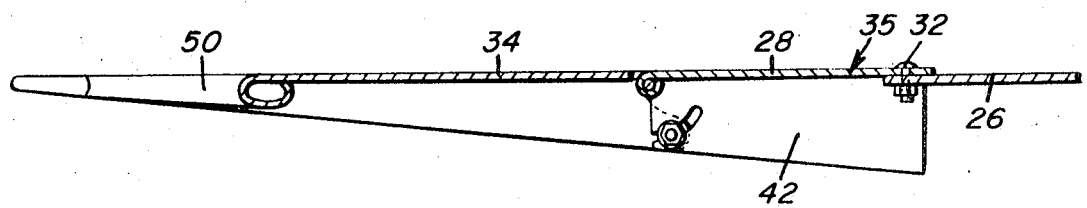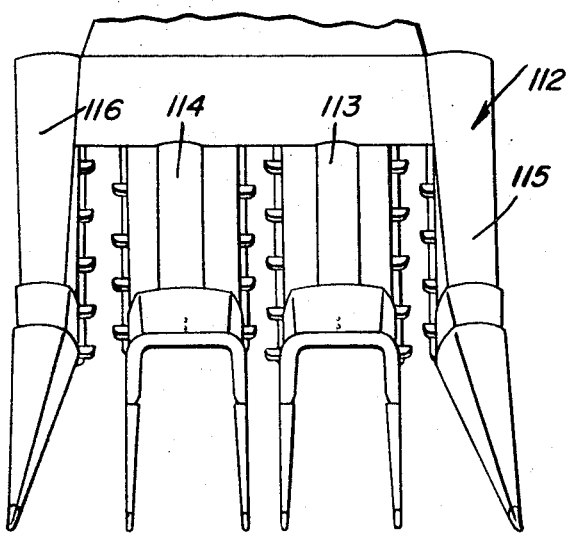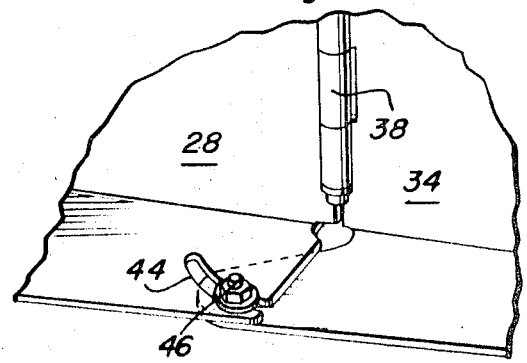
Lester Kalkwarf
INVENTOR

CORN HARVESTER SPLIT ADJUSTABLE SNOUT CONSTRUCTION

Corn combines are presently conventionally provided with forwardly projecting snouts or divider elements spaced transversely of the combine. These snouts are inclined forwardly and downwardly and include pointed forward end portions adapted to be advanced forwardly immediately above the ground and to pick up fallen cornstalks for guiding between the snouts or divider elements. The areas between adjacent snouts or divider elements define throats at whose rear ends picking units are disposed. However, multiple row corn harvester heads are provided with forwardly projecting snouts or divider elements adapted to ride between adjacent rows of corn and accordingly, the forward ends of the divider elements are spaced substantially halfway between adjacent rows of corn. While this spacing of the forward ends of the snouts or divider elements is sufficient in most cases, if a substantial portion of the corn crop has fallen down, at least some of the corn will be lying lengthwise on the ground in a position inclined only slightly relative to the rows of corn. In such an instance, the pointed forward ends of the snouts or dividers of conventional corn heads may pass outside the free ends of corn stalks with the base ends of the snouts or dividers only acting to laterally displace the corn into position lying along the rows of corn. When this occurs, the picking units disposed between adjacent snouts or dividers units are unable to pick up the corn resulting in considerable loss of the crop.

It is accordingly the main object of this invention to provide a corn head with divider elements or snout portions that may be readily adjusted so as to space their forward end portions more closely adjacent the rows of corn along which the associated combine is moving then in centered positions between the rows of corn.

Another object of this invention, in accordance with the immediately preceding object, is to provide a corn head with bifurcated dividers or snouts whose furcations are pivotally supported at their rear base ends for angular displacement about upstanding axes.

A still further object of this invention is to provide an improved multiple row corn head in accordance with the preceding objects and which may still be angularly displaced about a horizontal transverse axis at their base ends, as is conventional.

A final object of this invention to be specifically enumerated herein is to provide an improved multiple row corn head in accordance with the preceding objects which will conform to conventional forms of manufacture, be of simple construction and be easy to adjust so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a fragmentary enlarged longitudinal vertical sectional view taken substantially upon the plane indicated by section line 3–3 of FIG. 1;

FIG. 4 is a fragmentary horizontal sectional view taken substantially upon the plane indicated by section line 4–4 of FIG. 3;

FIG. 5 is a fragmentary perspective view of a three row corn head constructed in accordance with the present invention; and FIG. 6 is an enlarged fragmentary perspective view of a snout constructed in accordance with the present invention illustrating the manner in which the swingable portion of the snout may be retained in adjusted angularly displaced position.

Figure 1:
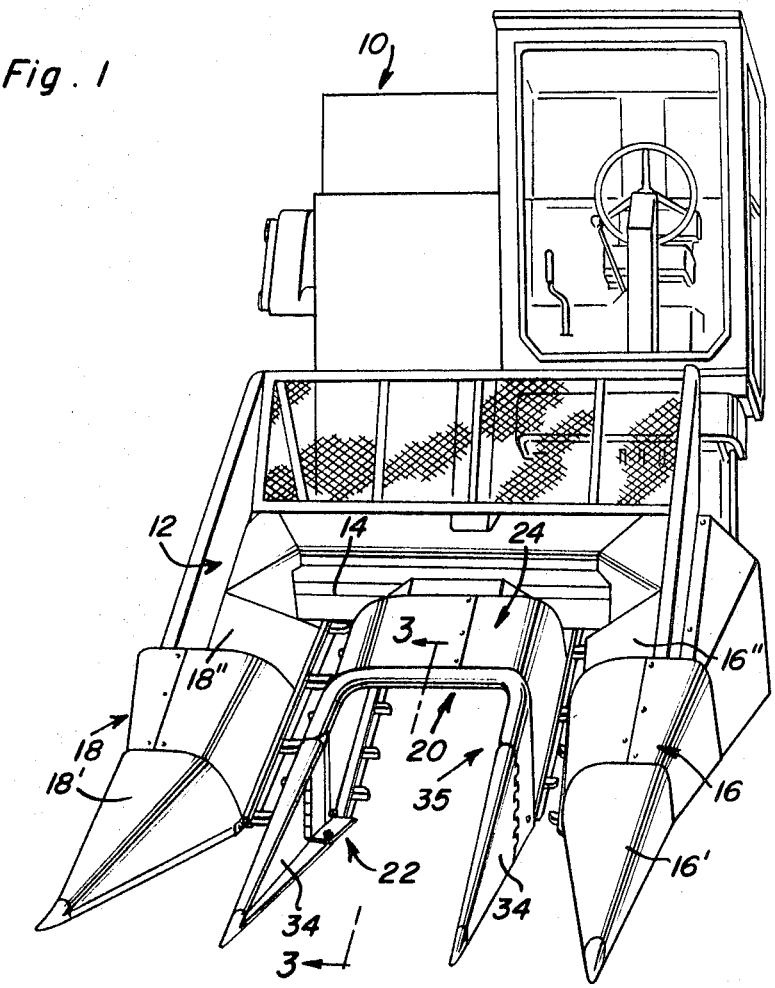
FIG. 1 is a perspective view of the front portion of a conventional form of corn harvester provided with the split adjustable snout construction of the instant invention.

Referring now more specifically to the drawings the numeral 10 generally designates a conventional form of combine including a two row head referred to in general by the reference numeral 12. The head 12 includes a transverse frame 14 and a pair of opposite side outer divider assemblies or snouts referred to in general by the reference numerals 16 and 18. The head 12 further includes a center inner snout referred to in general by the reference numeral 20 and which has been modified in accordance with the present invention.

The snouts 16 and 18 include forward end portions 16' and 18' which are swingable about lower horizontal transverse axes relative to the rear end portions 16" and 18" thereof. However, the forward end portions 16' and 18' are not supported for angular displacement about upstanding axes.

The center snout 20 includes a forward section referred to in general by the reference numeral 22 and a rear section referred to in general by the reference numeral 24. The rear section 24 includes opposite side plate portions 26 to which corresponding opposite side plate portions 28 of the front section 22 are secured by means of horizontal transverse pivot fasteners 32. The forward section 22 defines a pair of horizontally spaced apart forwardly projecting arms 34. In addition, the forward section 22 includes a rear end portion generally referred to by the reference numeral 35 which is bifurcated and defines a pair of forwardly projecting transversely spaced stub arms 36 of which the plate portions 28 comprise the lower extremities thereof. The rear ends of the arms 34 and the forward ends of the stub arm portions 36 are joined by piano-type hinge assemblies 38. Thus, the arms 34 are swingable about upstanding axes relative to the stub arm portions 36. Also, it will be noted that the hinge assemblies 38 are disposed on the inner sides of the arms 34 and the stub arm portions 36.

In addition, the lower marginal edge portion of the arms 34 include inwardly directed horizontal flange portions 40 and the lower marginal edge portions of the stub arm portions 36 include inwardly directed flange portions 42. The flange portions 40 each have an aperture (not shown) formed therethrough and spaced outwardly of the hinge assembly 38 and the corresponding flange portions 42 have arcuate slots 44 formed therein registered with the apertures formed in the flange portions 40 and having the hinge assemblies 38 as their centers of curvature. A pair of fasteners 46 are secured through the registered slots 44 and bores or apertures and thus serve to maintain the arms 34 in adjusted angularly displaced positions. From FIGS. 1 and 2 of the drawings it may be seen that the arms 34 are swingable from straight forwardly projecting positions to forwardly converging positions with their forward ends abutting each other.

The rear end portions 35 include transverse portions 48 interconnecting the rear ends of the stub arm portions 36 thereof and the upper edge portions of the arms 34 are rolled and forwardly and downwardly inclined as at 50. In addition, the upper edge portions of the stub arm portions 36 are rolled and forwardly and downwardly inclined as at 52 and form upward extensions of the upper edge portions 50. Further, the transverse members 48 are connected to the rear sections 24 by means of adjustable length chains 54 whereby the downward inclinations of the front sections 22 relative to the rear sections 24 may be adjusted.

Figure 2:
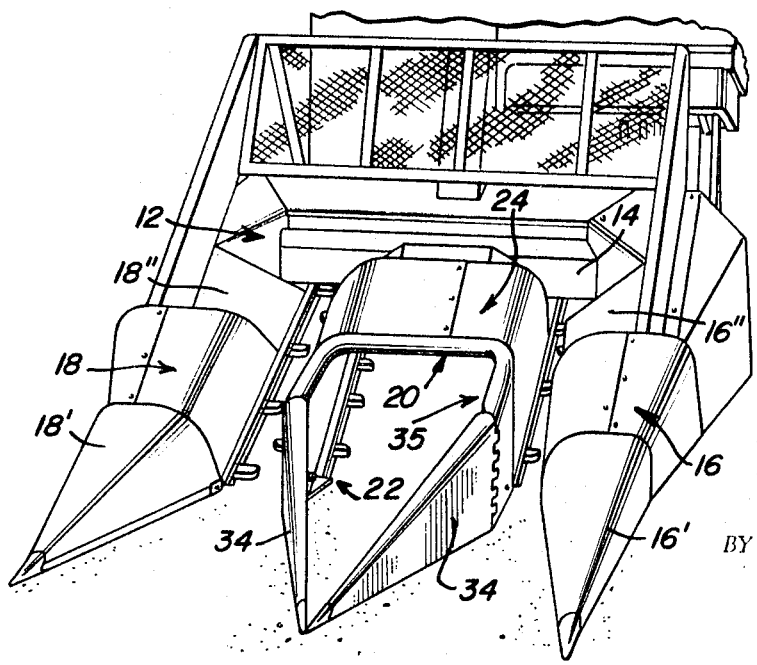
FIG. 2 is a fragmentary perspective view similar to the lower portion of FIG. 1 but illustrating the split snout construction with its forward ends swung toward each other.

In operation, if the corn to be harvested by the combine 10 is standing upright with substantially no fallen corn being present, the arms 34 may be adjusted so as to be positioned as illustrated in FIG. 2 of the drawings whereupon the combine 10 may be moved along the rows of corn with the rows centered between the center snout 20 and the end snouts 16 and 18. However, if any or substantially all of the corn has fallen, the arms 34 may be adjusted so as to swing the forward end portions apart to the positions thereof illustrated in FIG. 1 of the drawings. When so positioned, the arms 34 have their front ends spaced closely adjacent the rows of corn and thus the forward front ends of the arms 34 move closely along the base ends of the falling corn and pass beneath the corn so as to lift the latter into the picking zones defined between the center snout 20 and the end snouts 16 and 18. By providing the center snout with the laterally spaced-apart arms 34 which may be adjusted to the position thereof illustrated in FIG. 1, there is little tendency of the center snout to merely engage fallen corn and horizontally push the fallen corn on top of the rows as the combine 10 moves therealong. Instead, since the forward ends of the arms 34 may be adjusted in the maximum spaced-apart positions illustrated in FIG. 1 of the drawings, the forward end portions of the laterally spaced-apart arms 34 pass beneath the fallen corn and lift the fallen corn before it moves to the picking zones between the center snout 20 and the end snouts 16 and 18.

With attention now invited more specifically to FIG. 5 of the drawings there may be seen a three row corn head referred to in general by the reference numeral 112 and which is substantially identical to the corn head 12 except that it includes two center snouts 113 and 114 interposed between the opposite end snouts 115 and 116 with the center snouts 113 and 114 each being constructed in substantially the same manner as the center snout 20.

Of course, a corn head may be constructed with any feasible number of center snouts similar to the center snout 20. In addition, these center snouts may be utilized on substantially all corn combines independent of the particular type of corn picking mechanisms utilized by these combines inasmuch as the arms 34 of such center snouts are provided only to provide a means whereby it is assured that a combine will be able to pick up fallen corn which is laying upon the ground in position substantially paralleling the rows of corn and which would not otherwise be able to be picked up inasmuch as conventional snouts such as the end snouts 16 and 18 tend to engage such fallen corn with the side surfaces of their rear ends and push the corn laterally toward the rows without lifting the corn.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

I claim:

1. A multiple row corn head for a combine including a frame, said frame including more than two side-by-side forwardly projecting transversely spaced divider elements, the remote outer opposite side divider elements including forwardly divergent inner sidewalls and each inner divider element, disposed between the remote outer opposite side divider elements, including a bifurcated forward end portion defining a pair of horizontally spaced-apart forwardly projecting edge upstanding panellike arms, means supporting the rear base ends of each of said arms from the rear end portion of the corresponding inner divider element for swinging about upstanding axes between generally parallel spaced-apart positions and forwardly convergent positions with the forward ends of said arms disposed closely adjacent each other, the rear ends of said arms being at least slightly laterally spaced from the opposing sides of the adjacent divider elements, said arms including forwardly and downwardly inclined upper marginal edge portions, and means operative to retain said arms in adjusted angularly displaced position.

2. The combination of claim 1 wherein said means supporting the base ends of said arms from the corresponding inner divider element rear end portion comprises a piano-type hinge structure secured to each arm rear end portion and the corresponding side of the associated inner divider element rear end portion.

3. The combination of claim 1 wherein said rear end portions of said divider elements are supported from said frame for adjustable angular displacement about horizontal axes extending transversely of said head.

4. The combination of claim 1 wherein the rear end portions of said inner divider elements, include forwardly projecting transversely spaced stub arm portions interconnected at their ends and to which the rear ends of said arms are swingably secured.

5. The combination of claim 1, wherein the rear end portions of said inner divider elements, include forwardly projecting transversely spaced stub arm portions interconnected at their ends and to which the rear ends of said arms are swingably secured, said stub arm portions including forwardly and downwardly inclined upper surfaces whose lower ends form rearwardly and upwardly extending extensions of the upper surfaces of said arms.

6. The combination of claim 5 wherein said rear ends of said divider elements include upper transverse portions extending between and whose opposite ends curve smoothly forwardly and downwardly into the upper rear ends of said stub arm portions.

7. A multiple row corn head for a combine including a frame, said frame including more than two forwardly projecting transversely spaced divider elements, each inner divider element, disposed between the remote outer opposite side divider elements, including a bifurcated forward end portion defining a pair of horizontally spaced-apart forwardly projecting arms, means supporting the rear base ends of each of said arms from the rear end portion of the corresponding inner divider element for swinging about an upstanding axis, whereby the spacing between the forward ends of each pair of arms may be varied, and means operative to retain said arms in adjusted angularly displaced position, each of said arms and the corresponding side of its supporting rear end portion including overlapped horizontal flange portions, one of said flange portions having an upstanding bore formed therethrough spaced radially outwardly of the corresponding upstanding axis and the other of said flange portions having an arcuate slot formed therein with which said bore is registered and having said corresponding axis as its center of curvature, said means operative to retain said arms in adjusted angularly displaced positions comprising a clamp bolt secured through said bore and slot.

8. A multiple row corn head for a combine including a frame, said frame including more than two forwardly projecting transversely spaced divider elements, each inner divider element, disposed between the remote outer opposite side divider elements, including a bifurcated forward end portion defining a pair of horizontally spaced-apart forwardly projecting arms, means supporting the rear base ends of each of said arms from the rear end portion of the corresponding inner divider element for swinging about an upstanding axis, whereby the spacing between the forward ends of each pair of arms may be varied, and means operative to retain said arms in adjusted angularly displaced position, said arms including forwardly and downwardly inclined upper surface portions, the rear end portions of said inner divider elements, including forwardly projecting transversely spaced stub arm portions interconnected at their rear ends and to which the rear ends of said arms are swingably secured, said stub arm portions including forwardly and downwardly inclined upper surfaces whose lower ends form rearwardly and upwardly extending extensions of the upper surfaces of said arms, the upper surface portion of said arms being generally semicylindrical and upwardly convexed.